Figure 1:
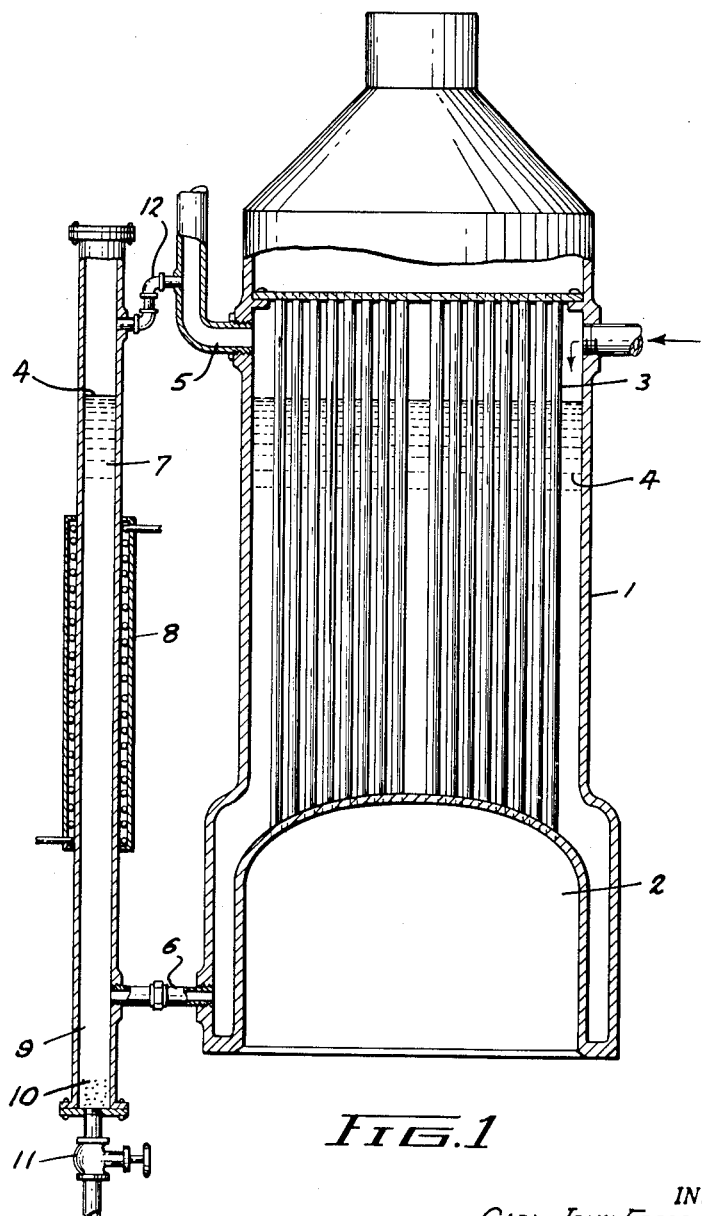

Feb. 7, 1956

C. J. F. JOHNSSON 2,733,693

METHOD FOR PREVENTING SEDIMENT FORMATION
IN BOILERS AND THE LIKE

Filed Jan. 29, 1952

2 Sheets-Sheet 1

INVENTOR.
CARL JOHN FREDRIK JOHNSSON
BY

ATTORNEY

Feb. 7, 1956   C. J. F. JOHNSSON   2,733,693
METHOD FOR PREVENTING SEDIMENT FORMATION
IN BOILERS AND THE LIKE
Filed Jan. 29, 1952   2 Sheets-Sheet 2
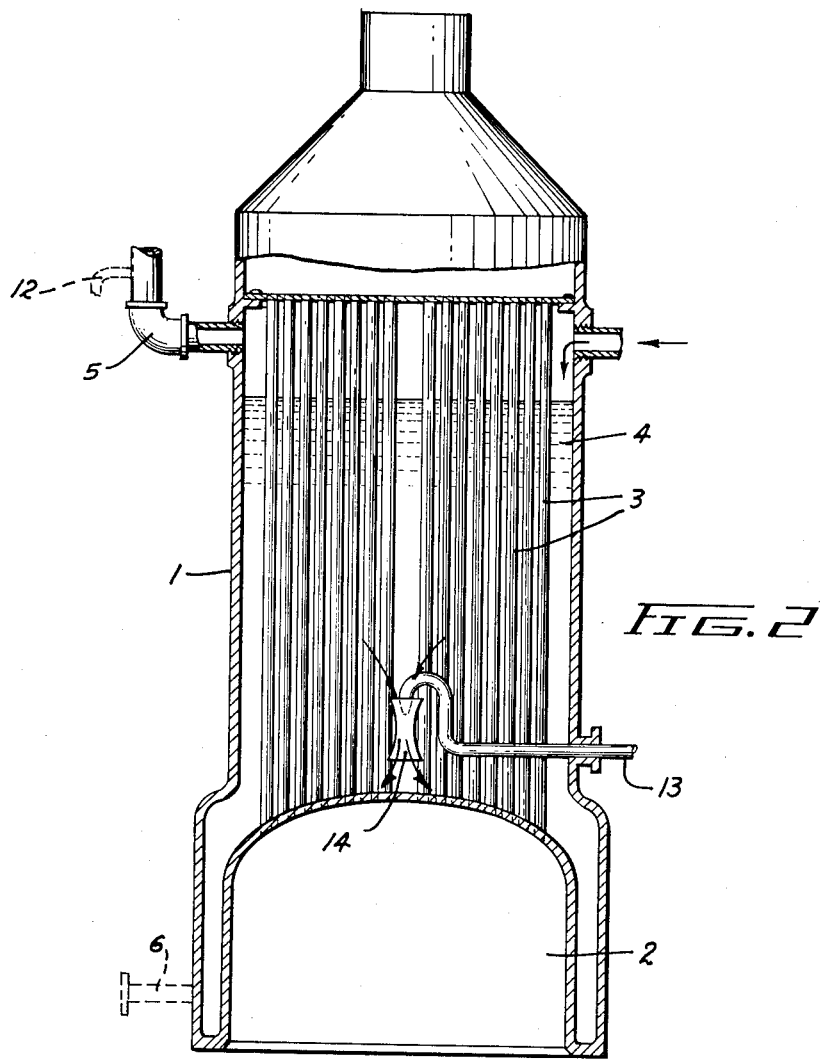
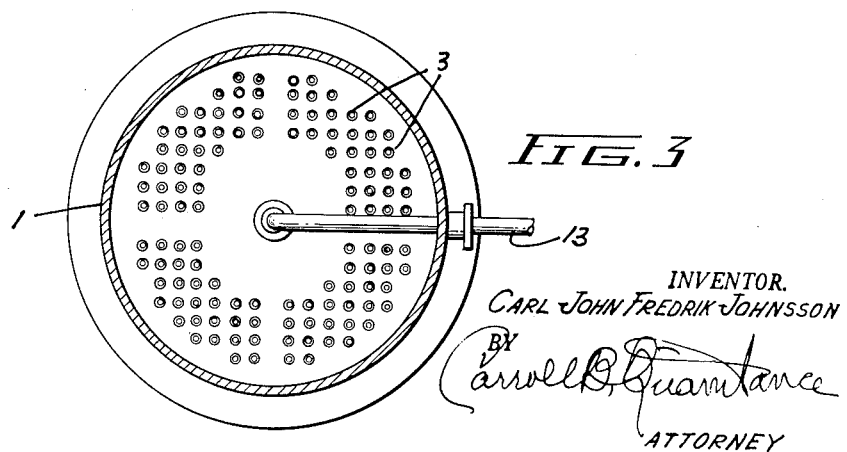
INVENTOR.
CARL JOHN FREDRIK JOHNSSON
BY
ATTORNEY United States Patent Office 2,733,693
Patented Feb. 7, 1956

2,733,693
METHOD FOR PREVENTING SEDIMENT FORMATION IN BOILERS AND THE LIKE

Carl John Fredrik Johnsson, Molndal, Sweden, assignor to Svenska Oljeslageri Aktiebolaget, Goteborg, Sweden Application January 29, 1952, Serial No. 268,753

Claims priority, application Sweden February 1, 1951

2 Claims. (Cl. 122—397)

This invention relates to a method for preventing the sedimentation of solid and/or tarry particles which are formed during the evaporation of liquids in boilers and similar apparatus. If these particles are allowed to settle or otherwise accumulate in the apparatus, they have a great tendency to cake together, or form coke if they are organic substances, thus causing crusts to form on the heating surfaces. These crusts not only impair the heat transfer but also cause local overheating of the metal walls which may thereby be destroyed so that serious accidents may arise. Local corrosion due to the products of heat decomposition has also been observed as a result of this crust formation.

My invention comprises a method for carrying out the heating and evaporation of the liquid in a state of relatively high turbulence thereby minimizing the tendency for the particles formed to deposit in undesirable locations, removing part of the boiling substance from the zone of boiling as a side stream, allowing this side stream slowly to move upward without turbulence so that the particles can settle out, e. g. into a suitably placed settling trap, and returning the thus clarified substance to the apparatus. I may remove from the trap the heavy matter settled out therein in any suitable manner. One suitable manner is to drain it off from the bottom of the trap as a sludge, i. e. as a thickened suspension in the liquid. I may drain off the sludge continuously or periodically in suitable intervals. I may recover the liquid from the sludge withdrawn, if this appears economically desirable, by any suitable means. Thus I may separate the liquid from the heavy matter by passing the sludge through a centrifugal machine or I may use a filter press for achieving this separation. In many cases the separation proceeds so readily that the liquid just runs off from the solid particles in a sieve or the like so that I do not need any special devices.

My invention may with great advantage be used for ordinary steam boilers. A specially useful application of my invention is in connection with boilers employing organic liquids as evaporating medium. While relatively stable organic compounds such as biphenyl or diphenyl oxide or a mixture of both these substances or methyl naphthalenes and the like are with advantages used for this purpose, even the most heat stable organic compounds have a tendency to decompose slowly and unavoidably form tar-like and/or coke-like insoluble matter which in turn settles out and forms the undesirable crusts referred to above.

In order to achieve this circulating motion of the liquid from the boiler to the auxiliary device, upward through this device, and back to the boiler again I may use any conventional means of propelling anywhere in the circulating system. Thus I may mount a small rotating propeller or screw into the transfer lines to or from the auxiliary device or I may use a small pump, rotary or reciprocating, anywhere in the side stream, or I may use a small injector operated by part of the boiler feed. One preferred method for carrying out my invention comprises returning the clarified liquid as vapor to the system. This I can achieve by supplying auxiliary heat to the upward moving side stream so that the liquid evaporates at such a rate that the heavy particles can settle out as described above. I prefer to supply the heat of evaporation to the upper part of the riser tube so as to avoid turbulence by convection in the lower part of the riser tube where the settling takes place. This preferred method has the great advantage of avoiding all moving parts for circulating the side stream. By applying this principle the apparatus for carrying out my invention becomes extremely simple: The whole apparatus can be considered as a U-tube. Its wider leg is formed by the boiler while its narrower leg consists of an auxiliary apparatus which bears the settling trap at its lower end and a heating device near the upper end. The top of the auxiliary apparatus is connected by a vapor line to the vapor space of the boiler. The liquid in the riser of the auxiliary apparatus will, according to the principle of communicating vessels, always rise to the same level as in the boiler. By simply regulating the rate of heat supply to the upper part of the riser I may regulate the rate of evaporation in the riser. This provides a very simple and convenient means for simultaneously regulating the rate of flow of the side stream from the boiler to the auxiliary apparatus.

I may for reasons of convenience and expediency use one auxiliary apparatus as described above for more than one boiler or if the boiler is a very large one I must use more than one auxiliary apparatus for one boiler. In such an arrangement I may place the transfer pipes from the boiler to the auxiliary devices at several endangered locations where the precipitate has a special tendency to accumulate.

Another preferred feature for carrying out my invention is to enhance the turbulence of the liquid in the boiler by forced agitation. This agitation prevents settling out of the heavy matter formed in undesirable locations in the boiler proper. While I may achieve the agitation by any suitable means, such as rotating screws or propellers, I prefer to apply the injector principle for agitating the liquid. Thus I may use the boiler feed, which in most cases consists of the condensate from such parts in the plant where the vapor had been used for heating and the like purpose, for operating the injector. I may prefer to place the injector in a downward direction near the bottom of the boiler so that it sucks in a considerable part of the liquid surrounding it and throws it downward against the boiler bottom thus preventing any particles, to settle in this specially endangered location. I may also use more than one agitating device. This is especialy advisable in large boiler installations and/or in apparatus where the evaporation is used as a means for removing excess heat of reaction. In such cases the boiling chamber serving as cooling device cannot always be designed so as to avoid dead corners and the like so that a multitude of agitating devices may become necessary.

By using my invention I can completely eliminate the troublesome formation of sediments and/or crusts upon heating surfaces, tube bundles, etc. The precipitate can be removed periodically as sediment from the trap without interruption of the boiler operation. The whole plant can operate continuously under the optimum conditions. Thereby I avoid time-consuming cleaning and interruption of the operation.

For obtaining the most favourable results with a given plant it is necessary to adjust the evaporation capacity in the auxiliary apparatus according to the velocity of formation of heavy matter in the boiler. By evaporating a certain amount of liquid from the auxiliary apparatus a corresponding amount of liquid from the boiler must automatically flow to the riser. As the liquid flowing to the riser contains the heavy particles which have been formed in the boiler, a continuous transport of these particles takes place from the boiler to the auxiliary apparatus.

We assume that the volume of liquid in the boiler is $(a)$ litres and that in the unit of time $\Delta t$, $x$ kg. of sediment are formed in the boiler. We may assume that $$\frac{x}{\Delta t}$$

is constant. We adjust the evaporation of liquid from the auxiliary apparatus such that $(a)$ litres evaporate in the time $\Delta t$. From this follows that $$\frac{x}{2} \text{ kg.}$$

precipitate passes to the auxiliary apparatus in the unit of time.

Thus, if we start with a boiler filled with clear liquid and $x$ kg. of sediment are formed in the unit of time $$\Delta t: \frac{x}{2} \text{ kg. precipitate}$$

of sediment passes to the auxiliary apparatus in time $\Delta t$, there remains in the boiler after the time $$2\Delta t: \quad x\left(\frac{1}{2^2}+\frac{1}{2}\right) \text{ kg. precipitate}$$

$$3\Delta t: \quad x\left(\frac{1}{2^3}+\frac{1}{2^2}+\frac{1}{2}\right) \text{ kg. precipitate}$$

$$n\Delta t: \quad x\left(\frac{1}{2^n}+\frac{1}{2^{n-1}}+\cdots\frac{1}{2}\right) \text{ kg. precipitate}$$

$$\Delta t \text{ and } \frac{x}{2} \text{ kg.}$$

If $n$ approaches infinity the value for the factor in parenthesis approaches one as a limit because $$\lim_{n\to\infty}\left(\frac{1}{2^n}+\frac{1}{2^{n-1}}+\cdots\frac{1}{2}\right)=1$$

i. e. the amount of precipitate remaining in the boiler can never exceed the amount $x$ which continuously is formed during each interval $\Delta t$. By choosing a suitable evaporating velocity in the auxiliary apparatus the maximum concentration of the precipitate in the boiler can be varied. For practical and economic reasons the evaporating capacity of the auxiliary apparatus should not be too large. I have found that for boilers using a mixture of biphenyl and diphenyl oxide the optimum value for $\Delta t$ is about 24 hours. In order to define my invention more clearly one special method of carrying it into practice is described in the following example which is illustrated by the drawings attached. It should, however, be emphasized that my invention is not limited to this particular method and/or apparatus but only by the accompanying claims which are intended to cover the invention as broadly as possible in view of prior art. Figure 1 shows a diagrammatic vertical section of a boiler or the like apparatus provided with an auxiliary apparatus for carrying out my invention. Figure 2 shows the same boiler in vertical section with a feed pipe provided with an agitating injector according to my invention. Figure 3 is a horizontal section through the same boiler according to the Figure 2.

The boiler or the like apparatus 1 surrounds a fire box 2 with its lower end. The cylindrical upper part of the boiler is provided with a bundle of tubes 3, which are heated from the inside by the combustion gases passing through and thereby heat the heat transfer medium 4, e. g. the mentioned mixture of biphenyl and diphenyl oxide. This liquid fills the greater part of the free space of the boiler round the fire box 2 and the tube bundle 3. The vapor line 5 is connected to the upper end of the boiler. Its lower end is connected by a pipe 6 with the auxiliary apparatus which has the shape of a vertical cylindrical column 7. The auxiliary apparatus 7 is provided, just under the liquid level, with a heating device 8 for external or internal heating. This heating device is designed so that its heat supply can be adjusted to evaporate the liquid 4 with a suitable velocity and may preferably be an electric heating device. The lower end of the column 7 is provided with a trap 9 for collection of precipitate 10 from the liquid. The transfer pipe 6 from the boiler 1 is arranged in such a way that the flow of the liquid coming in does not agitate the precipitate, which has accumulated in the trap 9. It is therefore quite easy to drain the precipitate 10 from the trap 9 through a valve 11 which is attached to the bottom of the trap 9.

In this way the boiler is kept entirely free from sedimentation of the precipitate. The auxiliary apparatus 7 is furthermore provided with a vapor line 12 which is connected with the vapor line of the boiler proper 5.

If I choose to provide the boiler with forced agitation, I may use an arrangement shown in Figures 2 and 3. In these figures the pipe 13 is the end of a feed line for recirculating the condensate not shown in Figure 1. This pipe ends inside the boiler at a point somewhat above the fire box 2 and in the centre of the space provided for the liquid. Its nozzle pointing downward is provided with a submerged agitating injector of conventional design 14. The condensate emerging from the pipe 13 creates in the injector a many times larger liquid stream which is directed vertically downward and causes a violent turbulence of the contents of the boiler. The direction of this turbulence is preferably the same as that of natural convection caused by the heat supply to the liquid. In this way both forces accelerate the liquid in the same direction, and can augment each other as evident from the drawing. The violent turbulence prevents sedimentation of the precipitate near the bottom of the boiler and in other spots, such as blind pockets, and homogenizes the precipitate formed in the boiler liquid. The precipitate held in suspension in this manner will, therefore, be present in a corresponding proportion in that part of the liquid which flows into the auxiliary apparatus 7 by the continuous evaporation in the upper end of the riser.

I have carried out a practical test with the apparatus described and shown by the drawings attached. The boiler was filled with a mixture of biphenyl and diphenyl oxide and heated with fuel oil. It had a heat capacity of 600,000 kg. kal/$h$, the pressure was 3 atm. gauge, and the total boiler volume amounted to 3,500 litres. The auxiliary apparatus had an evaporation capacity of 3,500 litres of the said mixture per 24 hours. The heat necessary for this evaporation was supplied to the riser column of the auxiliary apparatus by an electric heating element with a capacity of 15 kw. The inside diameter of the auxiliary apparatus was 200 mm. and its total height 4,000 mm. The lower part with a volume of about 13 litres acted as sludge trap. From the trap a total of 20 litres of sludge was drained during the course of every week. This contained the insoluble coke-like products as granules with a diameter up to 1 mm., and it was therefore very easy to separate the liquid from the precipitate by filtration. The draining did not have the slightest influence upon the operation of the plant. The condensate line to the boiler was provided with an injector according to Figure 2. On account of the low latent heat of evaporation of the organic mixture the average feed rate amounted to as much as 5,000 kg. of condensate per hour. This caused such a powerful agitation of the contents of the boiler that the precipitate formed in the boiler remained evenly suspended.

An inspection after 60 and 75 days of operation showed that the heating tubes as well as the boiler bottom was completely free from sediments. Before the improvements according to my invention had been made on this boiler, it had to be cleaned regularly every 4 weeks when the bottom was covered with a more than ½"

thick layer of sediment while the tubes had a crust of ⅛".

This example shows the great advantage of my invention in the operation of a plant using a mixture of biphenyl and diphenyl oxide. Even if the example described concerns an application of my invention for a purpose for which it has proved to be particularly useful, my invention is not in any way limited to the use in boilers. It can with equal advantage be used in connection with all kinds of apparatus which are used in order to evaporate a liquid that tends to form a precipitate. As an example for other uses to which my invention may be put, apparatus may be named which commonly are used for carrying out highly exothermic gas reactions, e. g. the catalytic oxidation of naphthalene to phthalic anhydride, or ethylene to ethylene oxide, where there is used a mixture of biphenyl and diphenyl oxide or similar substances as a medium for taking up the excess heat of reaction by evaporation. Another application of my invention is in connection with heating jackets for reaction vessels, stills, and the like if these heating jackets are partly or wholly filled with a boiling liquid tending to form a precipitate and are being heated from the outside so that the heat transfer proceeds by means of the said boiling liquid.

In certain cases I have found that it is not necessary to provide an auxiliary apparatus as described above but that it is sufficient to provide the boiler or the like apparatus only with the injector agitator 14 shown in the drawings Nos. 2 and 3. The increased turbulence is in these cases sufficient to prevent any sedimentation and/or crust formation during the normal operation periods of the apparatus. This applies especially to such cases in which the plant operation is intermittent anyhow so that the heat supply must be interrupted in regular periods for reasons other than inspection of the boiler. The precipitate formed during the operation period will settle out as mobile sludge after the agitation has ceased. This sludge can then be removed easily by conventional means without having to resort to scraping and other time-consuming means for removing crusts. Thus I may simply provide sludge valves at the lowest points of the boiler through which I may drain off the precipitate after it has had time to settle during the shut-off period. In this case no crust can form because the heating surfaces are not heated while the settling takes place.

I claim:

1. In an apparatus comprising at least one closed vessel partly filled with a liquid provided with means for heating said liquid to and maintaining it in a state of violent boiling and also provided with a vapor outlet therein above the level of said liquid, a device for removing from said liquid undesirable suspended matter having a specific gravity higher than the specific gravity of the liquid, said device comprising at least one straight vertical chamber of smaller volume than said vessel and in communication with the liquid in said vessel and extending from a point below the bottom of said vessel to a point above the liquid level in said vessel, the bottom portion of said straight vertical chamber forming a heavy matter settling trap provided with heavy matter discharge means, an intermediate settling section of said straight vertical chamber being provided with auxiliary means for heating the liquid in said intermediate settling section to, and maintaining said liquid in a state of, gentle boiling, said auxiliary means being disposed just below the common liquid level in said closed vessel and said straight vertical chamber, and a vapor section at the top of said straight vertical chamber provided with a vapor outlet therefor.

2. A device for removing suspended coke and tar precipitates from an organic liquid boiler, comprising a straight vertical auxiliary boiler of smaller volume than said organic liquid boiler and disposed externally of the latter, a conduit connecting said auxiliary boiler with the organic liquid filled portion of said organic liquid boiler, said auxiliary boiler extending from a plane below the bottom of said organic liquid boiler to a plane above the organic liquid level in said organic liquid boiler, a portion of said auxiliary boiler below said communicating conduit forming a settling trap for suspended coke and tar precipitates, valve means being provided in the bottom of said settling trap adapted to permit discharge therefrom of accumulated coke and tar precipitates without interruption of boiler operation, heating means independent of the boiler heating means and disposed in cooperative relation to an intermediate section of said auxiliary boiler at a point below the common liquid level in said organic liquid boiler and communicating auxiliary boiler, the heat discharge capacity of said independent heating means being such that organic liquid is evaporated from said intermediate section at a rate causing a predetermined rate of upward flow of organic liquid through said auxiliary boiler, and an outlet conduit connected to a vapor space above the liquid level in said auxiliary boiler.

References Cited in the file of this patent

UNITED STATES PATENTS

| | | |
|---|---|---|
| 385,510 | Eno | July 3, 1888 |
| 497,046 | Benjamin | May 9, 1893 |
| 725,540 | Cawley | Apr. 14, 1903 |
| 897,609 | Fairchild | Sept. 1, 1908 |
| 1,040,688 | Jones | Oct. 8, 1912 |
| 1,269,052 | Clark et al. | June 11, 1918 |
| 1,269,053 | Clark et al. | June 11, 1918 |
| 1,717,207 | Halle | June 11, 1929 |
| 1,927,555 | Oetken | Sept. 13, 1933 |
| 2,408,820 | Stamm | Oct. 8, 1946 |
| 2,519,845 | Majonnier et al. | Aug. 22, 1950 |
| 2,614,543 | Hood | Oct. 12, 1952 |
| 2,650,482 | Lobo | Sept. 1, 1953 |

FOREIGN PATENTS

| | | |
|---|---|---|
| 100,152 | Australia | Jan. 21, 1937 |